(12) United States Patent
Kevenaar (10) Patent No.: US 9,015,488 B2
(45) Date of Patent: *Apr. 21, 2015

(54) SECURE INDIRECT ADDRESSING

(75) Inventor: Thomas Andreas Maria Kevenaar, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 435 days.

This patent is subject to a terminal disclaimer.

(21) Appl. No.: 12/908,034

(22) Filed: Oct. 20, 2010

(65) Prior Publication Data

US 2011/0035597 A1    Feb. 10, 2011

Related U.S. Application Data

(63) Continuation of application No. 10/562,543, filed as application No. PCT/IB2004/051066 on Jun. 30, 2004, now Pat. No. 8,015,413.

(30) Foreign Application Priority Data

Jul. 3, 2003    (EP) .................................... 03101998

(51) Int. Cl.
     *H04L 29/06*      (2006.01)
     *H04L 12/701*      (2013.01)
     *H04L 12/18*      (2006.01)
     *H04L 12/761*      (2013.01)

(52) U.S. Cl.
     CPC ................ *H04L 45/00* (2013.01); *H04L 12/18* (2013.01); *H04L 45/16* (2013.01)

(58) Field of Classification Search
     CPC ......... H04L 12/18; H04L 45/16; H04L 45/00; H04L 63/0414; H04L 63/0428; H04L 63/0435; H04L 63/0464; H04L 63/12; H04L 63/123; H04L 63/126
     USPC .................................................. 713/181, 153
     See application file for complete search history.

(56) References Cited

U.S. PATENT DOCUMENTS

| 5,455,865 | A | * | 10/1995 | Perlman | 713/153 |
|---|---|---|---|---|---|
| 5,748,736 | A | * | 5/1998 | Mittra | 713/163 |
| 5,917,820 | A | * | 6/1999 | Rekhter | 370/392 |
| 6,092,191 | A | * | 7/2000 | Shimbo et al. | 713/153 |
| 6,507,908 | B1 | * | 1/2003 | Caronni | 713/153 |
| 6,643,773 | B1 | * | 11/2003 | Hardjono | 713/153 |
| 6,725,276 | B1 | * | 4/2004 | Hardjono et al. | 709/238 |
| 6,795,917 | B1 | * | 9/2004 | Ylonen | 713/160 |

(Continued)

FOREIGN PATENT DOCUMENTS

| EP | 1032178 A1 | 2/1999 |
|---|---|---|
| EP | 0902569 A1 | 3/1999 |

(Continued)

OTHER PUBLICATIONS

Peter S. Kruus, et al, "Techniques and Issues in Multicast Security", IEEE, Oct. 1998, pp. 1028-1032, XP0100307977.

*Primary Examiner* — David Garcia Cervetti (57) ABSTRACT

An efficient solution for secure implementation of indirect addressing (IA) is described. IA may be used, for example, in networks of which the routing algorithms are not capable of multicast but also contain very constrained devices that, although requiring multicast, are not capable of repeated unicast. This ID is useful in wireless networks containing low-power low-cost devices.

14 Claims, 4 Drawing Sheets

(56) References Cited

U.S. PATENT DOCUMENTS

| | | | |
|---|---|---|---|
| 6,842,456 B1 | 1/2005 | Chen et al. | |
| 6,957,346 B1 * | 10/2005 | Kivinen et al. | 713/153 |
| 7,106,730 B1 | 9/2006 | Bass et al. | |
| 7,240,199 B2 * | 7/2007 | Tomkow | 713/168 |
| 7,328,009 B2 | 2/2008 | Takeda et al. | |
| 7,340,509 B2 * | 3/2008 | Daum et al. | 709/220 |
| 7,441,043 B1 * | 10/2008 | Henry et al. | 709/238 |
| 7,734,913 B2 * | 6/2010 | Morino et al. | 713/161 |
| 8,245,028 B2 * | 8/2012 | Calcev et al. | 713/153 |
| 8,245,032 B2 * | 8/2012 | Donley et al. | 713/160 |
| 8,301,882 B2 * | 10/2012 | Smith | 713/160 |
| 8,302,160 B2 * | 10/2012 | Hofmann et al. | 726/3 |
| 8,555,056 B2 * | 10/2013 | Smith et al. | 713/160 |
| 8,769,267 B2 * | 7/2014 | Gutt et al. | 713/160 |
| 2002/0042875 A1 * | 4/2002 | Shukla | 713/151 |
| 2002/0078353 A1 | 6/2002 | Sandhu et al. | |
| 2003/0223402 A1 | 12/2003 | Sanchez et al. | |
| 2004/0015570 A1 * | 1/2004 | Daum et al. | 709/220 |
| 2004/0029576 A1 * | 2/2004 | Flykt et al. | 455/422.1 |
| 2004/0193876 A1 * | 9/2004 | Donley et al. | 713/162 |
| 2005/0220125 A1 | 10/2005 | Dotaro et al. | |
| 2007/0014237 A1 * | 1/2007 | Nishibayashi et al. | 370/229 |
| 2007/0115977 A1 * | 5/2007 | Kevenaar et al. | 370/392 |
| 2007/0260879 A1 * | 11/2007 | Dzung | 713/163 |
| 2011/0010547 A1 * | 1/2011 | Noda | 713/168 |

FOREIGN PATENT DOCUMENTS

| | | |
|---|---|---|
| JP | 20000261429 A | 9/2000 |
| WO | 0062503 A1 | 10/2000 |

* cited by examiner

SECURE INDIRECT ADDRESSING

This is a continuation of prior application Ser. No. 10/562,543 filed Dec. 28, 2005 which issued as U.S. Pat. No. 8,015,413 on Sep. 6, 2011 and is incorporated by reference herein and which is the National Stage of International Application No. PCT/IB2004/051066, filed Jun. 30, 2004, which claims priority of foreign application EP 03101998 filed Jul. 3, 2003.

The invention relates to a method of communicating a communication fragment. The invention further relates to the corresponding sender device, router device, receiver device, system, and signal implementing this method.

In communication networks often the distinction is made between unicast, multicast and broadcast. Unicast is the situation where a single device (the sender device) sends a message to a single other device (the receiver device). In multicast, the sender device sends a message to a number (more than one, but not all) of receiver devices, while in broadcast, the sender device sends a message to all devices in the network.

While nearly all networks contain routing algorithms that support unicast, this is not always the case for multicast. When the routing algorithms do not support multicast and a single device still wants to address several devices, multicast can be achieved by repeated unicast.

However, the sender device might not be able or allowed to do repeated unicast due to, for example, power or cost constraints. An example is a wireless control network used to control lights in large public spaces. Here a single, cheap light switch must be capable of switching more than, say, 50 lights. It is obvious that many more application examples can be found.

A solution to this problem can be found in indirect addressing (IA). where a second device (the router device) is available in the vicinity of the sender device. The sender device will then send a single message to the router device which will subsequently perform repeated unicast.

However, problems are related to the security aspects of IA. For example, the application running on the sender device might want to encrypt its message using a cryptographic key $K_G$ known only to members of a group G. Further the sender device might want to apply a Message Integrity Code (MIC) on parts of the communication such as its own address ID1 and the destination address G in the message also using $K_G$. The result is that only the members of G (but not the router device) can read the message and receiving devices can verify if indeed the message is intended for them and if it was sent by the sender device ID1.

Communication protocols are commonly described using a layered, OSI-like stack. Part of this stack are, from bottom to top, the physical layer (PHY), the medium access control layer (MAC), the network layer (NWK) and the application layer (APL). Frames exchanged between equal layers on different devices consist of a header and a payload. A frame at level n in the stack is physically sent as the payload of a frame at layer n−1. The abbreviations to identify some of the fields in these headers are as follows: SRC for source address, DEST for destination address, and INF for information field.

A straightforward but inefficient solution to the problem would be to have the application layer compute a MIC on the message, and on its destination address and on its source address using the group key $K_G$.

The NWK layer will then also add the NWK-DEST and NWK-SRC addresses, as they are usually required by the routing algorithms. It might further compute an additional MIC on these two NWK addresses. As compared to the solutions given above this will result in more overhead (one or two more addresses) and one additional MIC to be sent which makes this solution less efficient. A second drawback is that the APL level is concerned with verifying address information, a task which more naturally belongs at a lower layer.

It is therefore an object of the invention to provide a method that improves the efficiency of indirect addressing while providing security.

This object is realized by a method of communicating a communication fragment, the communication fragment comprising a first target address reference referring to a group of at least one receiver device, comprising the steps of:—a sender device adding a cryptographic message integrity code to protect at least part of the communication fragment,—the sender device transmitting the protected communication fragment to a router device,—the router device, for at least one receiver device in the group of target devices, modifying the first target address reference into an address of the at least one receiver device, while maintaining the unchanged cryptograph message integrity code, and subsequently forwarding the modified protected communication fragment to the at least one receiver device,—the at least one receiver device receiving the modified protected communication fragment,—the at least one receiver device restoring the original protected communication fragment in order to allow verification of the original protected communication fragment using the message integrity code.

For security reasons, the addressing information should be protected with a MIC using the key $K_G$. However, the router device should be able to change the addressing information in order to do repeated unicast. Obviously, since G is protected by the MIC, it cannot simply be substituted by a target address to do repeated unicast: when the receiver device receives the communication fragment with the substituted address and it checks the MIC, it will find a mismatch because the protected information should contain G and not the receiver device ID. As a result, it will probably ignore the message.

The sender device therefore indicates the usage of indirect addressing by for example setting a special IA bit field in the message. (Alternatively, the router device may indicate the usage of indirect addressing by for example setting a special IA bit field in the message, after detecting, for example because the target address is a group identity, that indirect addressing is used). The addresses MAC-DEST and MAC-SRC indicate that a message is sent from ID1 to ID2. The addresses NWK-DEST and NWK-SRC indicate that the final destination of the message is all the members in G (possibly except ID1 itself) and that the message was sent by ID1. The NWK-INF field further indicates that the message is used in the context of indirect addressing (IA=1) and the application on ID1 encrypted the string m using the group key $K_G$ (indicated by $E_{KG}(m)$).

On receipt of the message from the sender device, the router device notices that it is an IA message by inspecting the IA bit in the NWK-INF field and it will perform a multiple unicast to all the members of group G (possibly except the sender device ID1). From its routing information (e.g. routing tables), the router device knows that a way to reach the receiver device is sending it to intermediate nodes. The router changes, for each receiver device, the NWK-DEST field from the entry G to the address of the receiver device ID, as intermediate hops are not aware of a group identity G and the unicast routing algorithms need a single, known device address as a final destination. Note further that, because of the replacement, the MIC and the protected information are no longer consistent. The receiver device upon receiving the message will replace the modified information, for example the receiver device ID by the group ID, and is subsequently]

able to verify the MIC. The receiver device should know the identity of all devices in G in order to perform this action. An alternative solution is that the sender device or the router device copies the group identity G somewhere in the communication fragment, for example in the NWK-INF field in the NWK frame. This way the receiver devices do not have to store the link between device identities and group identities and they can still substitute the group identity in the NWK-DEST field before verifying the MIC. In addition, multiple overlapping groups are supported in this manner.

The advantage of this solution is that the sender device only requires storing a very limited amount of information, and sending very short and few communication fragments. The activities of the router device (ID2) and intermediate hops are independent of the fact if the message by the sender device (here ID1) is secured or not. Only the group members and (of course) the router device need to be aware of indirect addressing; the intermediate nodes between the router device and the receiver devices are not aware of the indirect addressing mode. The router device need not be trusted with application data.

An advantageous implementation of the method according to the invention is described in claim 2. Use of a single bit field IA to indicate the use of the indirect addressing mode is simple and efficient.

An advantageous implementation of the method according to the invention is described in claim 4. Using a single common key both to encrypt the message content and to generate or verify the MIC results in an efficient implementation.

An advantageous implementation of the method according to the invention is described in claim 5. The receiver device attempts multiple substitutions of the target address reference by the groups the receiver device is a member of. This way, the receiver device is able to find the group identity for which the MIC matches. This alleviates the need to add the group identity in the communication fragment, therefore optimizing the communication fragment length.

An advantageous implementation of the method according to the invention is described in claim 6. This implementation allows the receiver device to restore the communication fragment without local information or without having to perform multiple attempts to find the matching group identity by storing or copying the original first target address reference into the modified protected communication fragment.

The sender device, router device, receiver device, system, and signal according to the invention are characterized as described in claims 7-11.

These and other aspects of the invention will be further described by way of example and with reference to the schematic drawings in which:

FIG. 4 shows the message formats on the MAC level during indirect addressing Throughout the figures, same reference numerals indicate similar or corresponding features. Some of the features indicated in the drawings are typically implemented in software, and as such represent software entities, such as software modules or objects.

Figure 1:
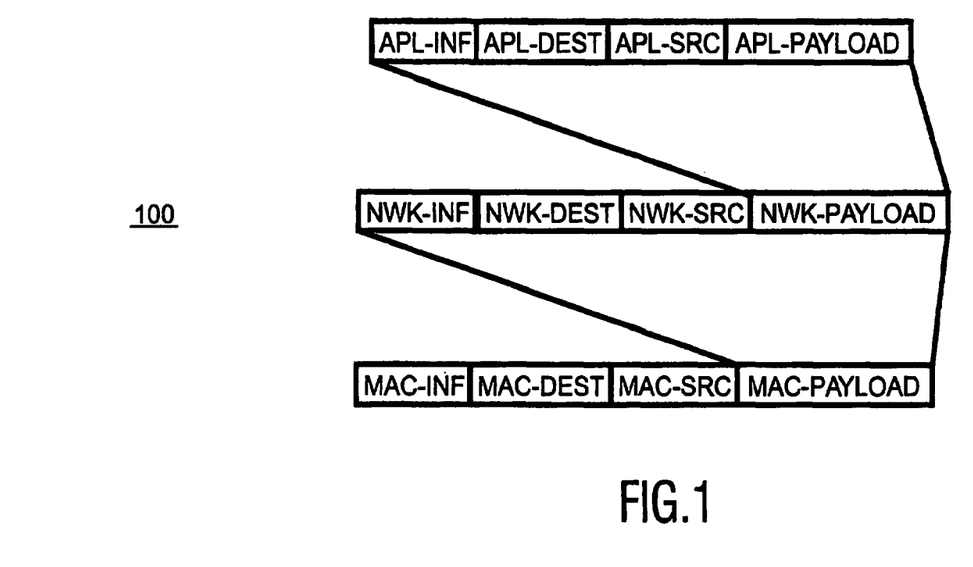
FIG. 1 shows an exploded view of a message at the MAC layer for a four-layer protocol stack.

Communication protocols are commonly described using a layered, OSI-like stack. An example stack comprises, from bottom to top, the physical layer (PHY), the medium access control layer (MAC), the network layer (NWK) and the application layer (APL). Frames exchanged between equal layers on different devices consist of a header and a payload and a frame at level n in the stack is physically sent as the payload of a frame at layer n−1. Thus, considering the top three layers in this four-layer protocol stack, FIG. 1 illustrates a message 100 sent by the MAC layer.

In many cases there is a close relation between the addresses at the APL layer and at the NWK layer which makes it possible to leave out duplicated address information in the APL layer in order to arrive at an efficient solution. Address information at the NWK layer can usually not be omitted because it is required by the routing algorithms. Because the APL addresses are usually equal to the NWK addresses or can be derived easily, they are not always present in order to reduce the size of the message.

Figure 2:
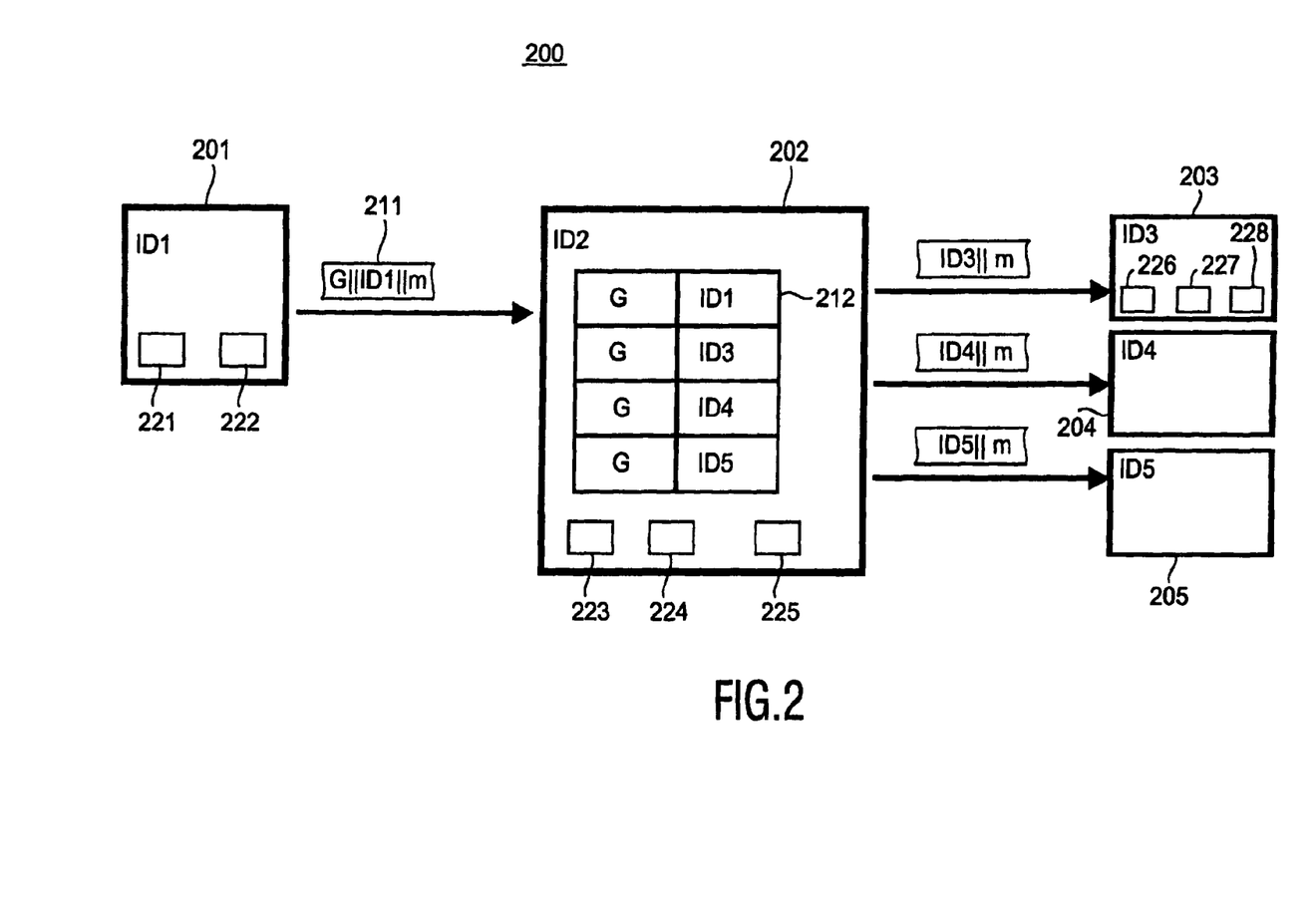
FIG. 2 shows a schematic example of indirect addressing.

The INF fields contain information for a receiving device on the different layers on what kind of information is present in the rest of the message and how it should be treated. For example, the MAC-INF field might indicate that the MAC-PAYLOAD is encrypted. This will show to the receiving device that it must first decrypt the payload before dealing with it further. Also, the NWK-INF field might indicate that the received frame is generated in the context of indirect addressing and should be treated accordingly. Indirect addressing is schematically depicted in FIG. 2. ID1, sender device 201, member of the group G={ID1, ID3, ID4, ID5}, sends a message 211 containing the final destination address G, its own address ID1 and a string m (i.e. the actual information to be sent to the group) to ID2, the router device 202. When ID2 receives the message and notices that the message coming from ID1 is intended for the group G, it will forward the message to ID3 203, ID4 204 and ID5 205 whose addresses it found in, for example, a pairing table 212.

As a security measure, the application running on ID1 generating the string m, might want to encrypt m using a cryptographic key $K_G$ known only to members of G. Further it might want to apply a Message Integrity Code (MIC) on its own address ID1 and the destination address G in the message also using $K_G$. The result of these security measures is that only the members of G (but not the router device) can read the message and receiving devices can verify if indeed the message is intended for them and if it was sent by ID1.

As the router device ID2 is not trusted by ID1, ID2 has no access to the key $K_G$. However, the router node should be able to change the addressing information on the NWK level in order to perform repeated unicast. Since G is protected by the MIC, it cannot simply be substituted by ID3, ID4 and ID5 to do repeated unicast: when the receiving devices ID3, ID4 and ID5 check the MIC, they will find a mismatch because the protected information should contain G and not ID3, ID4 or ID5, respectively. As a result, they will ignore the message.

Figure 3:
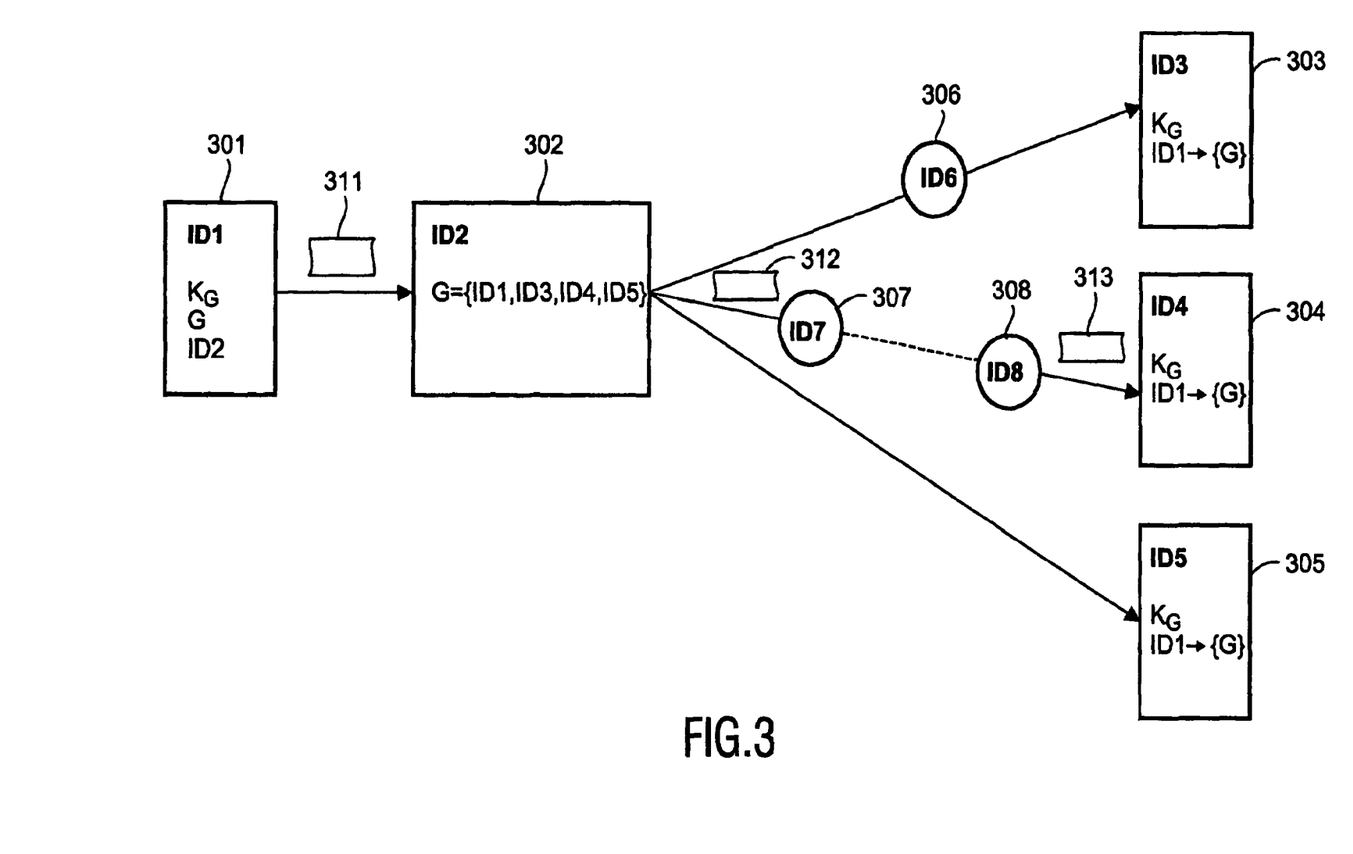
FIG. 3 shows a detailed example of indirect addressing.

As illustrated in FIG. 3, ID1 knows the cryptographic group key $K_G$, the identity of the group G (but not necessarily the addresses of all the group members) and the address of its router device ID2. Router device ID2 knows or is able to retrieve the addresses of all the members of G.

Figure 4:
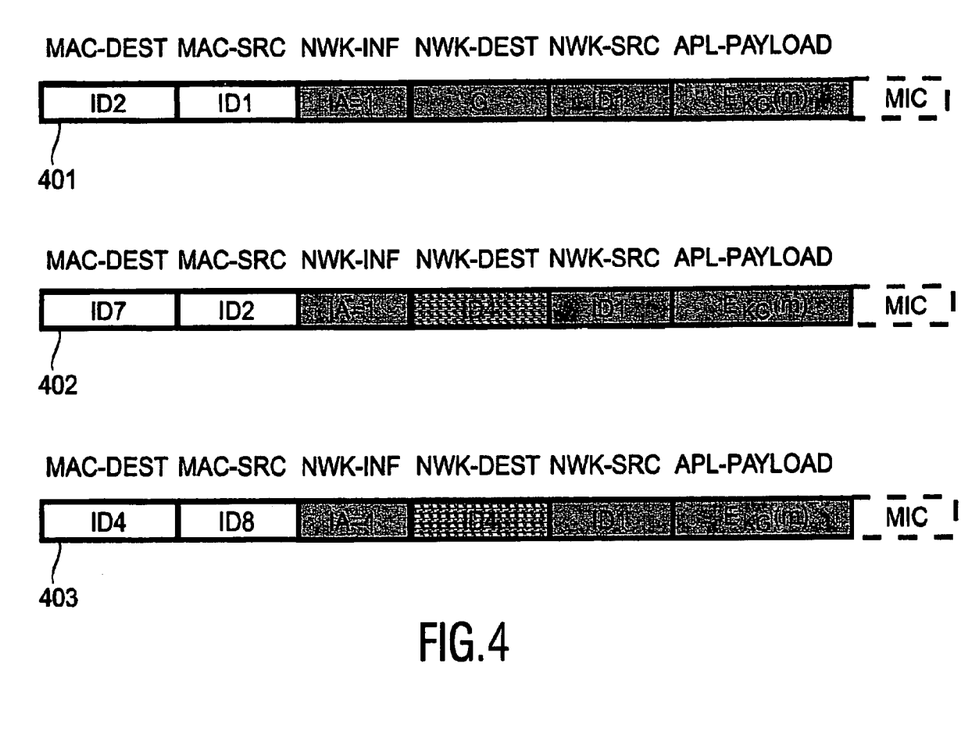

ID1 sends the message 301 to the router ID2 302 that, on the MAC level, will look like the message 401 in FIG. 4 where, as compared to FIG. 1, fields that are not relevant in the current explanation are omitted for clarity. The addresses MAC-DEST and MAC-SRC indicate that a message is sent from ID1 to ID2. The addresses NWK-DEST and NWK-SRC indicate that the final destination of the message is all members of G (possibly except ID1 itself) and that the message was sent by ID1. The NWK-INF field further indicates that it concerns a message in the context of indirect addressing (IA=1) and the application on ID1 encrypted the string m using the group key $K_G$ (indicated by $E_{K_G}(m)$) in APL-PAY- LOAD. A dark gray background in a message means that its content is protected by a MIC using $K_G$. As an alternative solution, the application on the sender device ID1 can decide not to encrypt m but only do add a MIC. In this case, $E_{KG}(m)$ in message 401 will be replaced by m.

On receipt of the message from sender device ID1 301, router device ID2 302 notices that it is an IA message by inspecting the IA bit in the NWK-INF field and it will perform a multiple unicast to all the members of G 303,304,305 (again, possibly except ID1). In an alternative implementation, on receipt of a message from a sender device, the router device, rather than checking the IA bit in the NWK-INF field, can also check the NWK-DEST field to conclude that the sender device sent an IA message.

Subsequently, the router device substitutes in the NWK-DEST field the value G by ID3, ID4 and ID5, respectively, hereby ignoring the resulting inconsistency between the information protected by the MIC and the MIC itself. The router is allowed to make other modifications to the protected information as long as the receiver devices are capable of undoing the modifications before verifying the MIC.

As an example, the unicast message from ID2 to ID4 is described. From its routing information (e.g. routing tables), ID2 knows that a way to reach ID4 is sending it to ID7 after which multiple hops might follow, as indicated in FIG. 3. The message ID2 sends to ID7 on the MAC level will then look like message 402 in FIG. 4. In the NWK-DEST field the entry G is replaced by ID4, because intermediate hops are not aware of a group identity G and the unicast routing algorithms need a single, known device address as a final destination. Because of this replacement, the MIC and the protected information are no longer consistent which is indicated by the striped/light gray background of the NWK-DEST field.

After possibly more hops, a message 313 finally ends up at ID4. If the one but last hop address was ID8 (see FIG. 3), the message looks like message 403. If ID4 knows the identity of all devices in G it can receive a message from (indicated by ID1→{G} in FIG. 3), then, by inspecting the NWK-SRC field in the received message, ID4 can obtain the group identity G. Before verifying the MIC on the message using $K_G$, it will replace ID4 in the NWK-DEST field by G.

Although this solution is very efficient in simple situations, there will be problems in more complicated situations. It might be, for example, that both ID1 and ID4 are a member of G but also of a different group G' in which ID1 is also a sender device. Upon receipt of a message, ID4 is not sure if it should replace ID4 in the NWK-DEST field by G or by G' because it will have stored ID1→{G, G'}. Clearly ID4 can try all the group identities in the list belonging to ID1 until a recomputed MIC matches the MIC in the message. An alternative solution is that ID copies the group identity G in the NWK frame, for example in the NWK-INF field. This way the receiver devices do not have to store the link between device identities and group identities and they can still substitute the group identity in the NWK-DEST field before verifying the MIC. The cost is that in this case, the messages to be sent will be longer.

As an alternative solution to storing G in the NWK frame, the receiver device can attempt multiple substitutions of the target address reference by the groups the receiver device and sender device are a member of. This way, the receiver device is able to find the group identity for which the MIC matches. This alleviates the need to add the group identity in the communication fragment, therefore optimizing the communication fragment length.

The advantages of the method according to the invention are as summarized below. The sender device only requires storing a very limited amount of information. The activities of the router device (ID2) and intermediate hops are independent of the fact if the message by the sender device (here ID1) is secured or not. Only the group members and (of course) the router device are aware of a group G. There is only one bit overhead in the messages (the IA bit in the NWK-INF field). The receiver devices have to store the links between device IDs and group IDs, which can be done efficiently. The router device need not be trusted with application data.

It is clear to a person skilled in the art that minor modifications to the solutions presented above still constitute the same solutions.

For example, to further reduce the size of the message from sender device ID1 to router device ID2, the identity of the router (ID2) might be omitted if it is clear from context. Receiving a message from ID1, the router might deduce from context that it must forward the message to the group G. This reduces even further the required amount of storage on the sender device and the length of the message to be sent by the sender device.

As a second example, to further reduce the size of the message from sender device ID1 to router device ID2, the sender device identity ID1 can be omitted from the group definition on the router device (here G={ID1, ID3, ID4, ID5}), if the router device is only acting as router for a single device in G (in this case ID1), Alternatives are possible. In the description above, "comprising" does not exclude other elements or steps, "a" or "an" does not exclude a plurality, and a single processor or other unit may also fulfill the functions of several means recited in the claims.

The invention claimed is:

1. A method of communicating a communication fragment, the communication fragment comprising a first target address reference identifying a group of target devices including at least one receiver device, the method comprising acts of:
   a sender device adding a cryptographic message integrity code to protect at least part of the communication fragment including the first target address resulting in a protected communication fragment,
   the sender device transmitting the protected communication fragment to a router device,
   the router device, for the at least one receiver device in the group of target devices, modifying the first target address reference into an address reference of the at least one receiver device, while maintaining the cryptographic message integrity code unchanged resulting in a modified protected communication fragment, and subsequently forwarding the modified protected communication fragment to the at least one receiver device,
   the at least one receiver device receiving the modified protected communication fragment, and
   the at least one receiver device restoring the protected communication fragment including substituting the first target address for the address reference of the at least one receiver device to allow verification of the protected communication fragment using the cryptographic message integrity code.

2. The method according to claim 1, wherein the communication fragment comprises a bit field to indicate whether indirect addressing is used.

3. The method according to claim 1, wherein the sender device and the at least one receiver device share a common cryptographic key, wherein the act of the adding the cryptographic message integrity code comprises an act of computing the cryptographic message integrity code using the common cryptographic key.

4. The method according to claim 3, comprising an act of encrypting the message content using the common cryptographic key.

5. The method according to claim 1, wherein the at least one receiver device restores the protected communication fragment by substituting the first target address reference with each of the group identities of groups that comprise the sender device to determine which of the group identities the cryptographic message integrity code matches.

6. The method according to claim 1, wherein:
the router device, in the step of modifying the first target address reference, storing the first target address reference in the modified protected communication fragment, and
the at least one receiver device restoring the protected communication fragment using a stored first target address reference in the modified protected communication fragment to enable verification using the cryptographic message integrity code.

7. The method according to claim 1, comprising an act of verifying the protected communication fragment using the cryptographic message integrity code.

8. A router device being arranged to route a communication fragment from a sender device towards a receiver device, the communication fragment comprising a first target address reference identifying a group of at least one receiver device, the router device comprising:
receiving means being arranged to receive the communication fragment, comprising a first address reference identifying the group of at least one receiver device, the communication fragment including the first target address at least partly being protected by a cryptographic message integrity code,
modifying means being arranged to modify the communication fragment, by replacing the first target address reference by an address reference identifying the at least one receiver device, while maintaining the cryptographic message integrity code unchanged resulting in a modified communication fragment, and
transmitting means to transmit the modified communication fragment to the at least one receiver device.

9. A receiver device being arranged to receive a modified communication fragment originating from a transmitter device through a router device, the modified communication fragment comprising a cryptographic message integrity code and an address identifying the receiver device, the modified communication fragment and the cryptographic message integrity code being derived from a communication fragment comprising a first target address reference identifying a group of at least one receiver device, the receiver device comprising:
receiving means being arranged to receive the modified communication fragment,
restoring means being arranged to restore the communication fragment that was used to compute the cryptographic message integrity code by modifying the address reference of the at least one receiver device into the first target address reference, and
verification means being arranged to verify the communication fragment using the cryptographic message integrity code.

10. A method of communicating a communication fragment, comprising acts of:
a sender device assembling the communication fragment, the communication fragment including a first target address reference identifying a group of at least one receiver device, adding a cryptographic message integrity code to protect at least part of the communication fragment including the first target address resulting in a protected communication fragment, and transmitting the protected communication fragment to a router device,
the router device, for the at least one receiver device in the group of at least one receiver device, modifying the first target address reference into an address reference of the at least one receiver device, while maintaining the cryptographic message integrity code unchanged resulting in a modified protected communication fragment, and subsequently forwarding the modified protected communication fragment to the at least one receiver device,
the at least one receiver device receiving the modified protected communication fragment, and
the at least one receiver device restoring the protected communication fragment including modifying the address reference of at least one receiver device into the first target address to verify of the protected communication fragment using the cryptographic message integrity code.

11. A router device for routing a communication fragment from a sender device towards a receiver device, the router device comprising:
a receiver arranged to receive the communication fragment from the sending device, the communications fragment comprising a first target address reference identifying a group of at least one receiver device, the communication fragment including the first target address at least partly being protected by a cryptographic message integrity code,
a processor programmed to modify the communication fragment, by replacing the first target address reference by an address reference identifying the at least one receiver device, while maintaining the cryptographic message integrity code unchanged resulting in a modified communication fragment, and
a transmitter arranged to transmit the modified communication fragment to the at least one receiver device.

12. A receiver device for receiving a modified communication fragment originating from a transmitter device through a router device, the receiver device comprising:
a receiver arranged to receive the modified communication fragment, the modified communication fragment comprising a cryptographic message integrity code and an address reference of the receiver device, the modified communication fragment and the cryptographic message integrity code being derived from a communication fragment comprising a first target address reference identifying a group of at least one receiver device, and
a processor programmed to restore the communication fragment that was used to compute the cryptographic message integrity code by modifying the address reference of the at least one receiver device into the first target address reference, and to verify the communication fragment using the cryptographic message integrity code.

13. A system comprising:
a router device being arranged to route a communication fragment from a sender device towards a receiver device, the router device including: first receiving means being arranged to receive the communication fragment, comprising a first target address reference identifying a group of at least one receiver device, the communication fragment including the first target address at least partly being protected by a cryptographic message integrity code, modifying means being arranged to modify the communication fragment, by replacing the first target address reference by an address reference referring to the at least one receiver device, while maintaining the cryptographic message integrity code unchanged resulting in a modified communication fragment, and transmitting means to transmit the modified communication fragment to the at least one receiver device;

a receiver device being arranged to receive the modified communication fragment originating from a transmitter device through the router device, the receiver device including:

second receiving means being arranged to receive the modified communication fragment from the routing device, restoring means being arranged to restore the communication fragment that was used to compute the cryptographic message integrity code by modifying the address reference of the at least one receiver device into the first target address reference, and verification means being arranged to verify the communication fragment using the cryptographic message integrity code.

14. A system for communicating a communication fragment, the system comprising:

a sender device adapted for adding a cryptographic message integrity code to protect at least part of the communication fragment including a first target address resulting in a protected communication fragment, the communication fragment comprising the first target address reference identifying a group of at least one receiver device, and for transmitting the protected communication fragment to a router device, the router device, for the at least one receiver device, being adapted for modifying the first target address reference into an address reference of the at least one receiver device, while maintaining the cryptographic message integrity code unchanged resulting in a modified protected communication fragment, and subsequently forwarding the modified protected communication fragment to the at least one receiver device, and the at least one receiver device being adapted for receiving the modified protected communication fragment, and restoring the communication fragment including modifying the address reference of at least one receiver device into the first target address to allow verification of the communication fragment using the cryptographic message integrity code.

* * * * *